US009184952B2

(12) United States Patent
Wu et al.

(10) Patent No.: US 9,184,952 B2
(45) Date of Patent: Nov. 10, 2015

(54) METHOD AND APPARATUS FOR GENERATING CODEBOOKS AND ASSOCIATED DATA IN A NETWORK DEVICE

(75) Inventors: Lu Wu, Shanghai (CN); Hongwei Yang, Shanghai (CN); Zhilan Xiong, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/114,329

(22) PCT Filed: Apr. 25, 2012

(86) PCT No.: PCT/IB2012/000985

§ 371 (c)(1), (2), (4) Date: Oct. 28, 2013

(87) PCT Pub. No.: WO2012/146982

PCT Pub. Date: Nov. 1, 2012

(65) Prior Publication Data

US 2014/0056380 A1 Feb. 27, 2014

(30) Foreign Application Priority Data

Apr. 28, 2011 (CN) .......................... 2011 1 0108990

(51) Int. Cl.
*H04B 7/02* (2006.01)
*H04L 1/02* (2006.01)
(Continued)

(52) U.S. Cl.
CPC ........ *H04L 25/03923* (2013.01); *H04B 7/0469* (2013.01); *H04B 7/0478* (2013.01); *H04L 25/03929* (2013.01)

(58) Field of Classification Search
USPC ................................................. 375/267, 299
See application file for complete search history.

(56) References Cited

U.S. PATENT DOCUMENTS

2008/0165870 A1* 7/2008 Kent et al. ..................... 375/260
2008/0186212 A1* 8/2008 Clerckx et al. .................. 341/55
(Continued)

FOREIGN PATENT DOCUMENTS

CN 101667895 A 3/2010
CN 101931507 A 12/2010
(Continued)

OTHER PUBLICATIONS

International Preliminary Report on Patentability Chapter I for PCT/IB2012/000985.*
(Continued)

*Primary Examiner* — Shuwang Liu
*Assistant Examiner* — Nader Bolourchi
(74) *Attorney, Agent, or Firm* — Fay Sharpe LLP

(57) ABSTRACT

A method and apparatus for generating a codebook and the associated data in a network device are provided in the invention. The method comprises the steps of generating a first row sub-matrix corresponding to a first group of antennas respectively for the respective ranks of the codebook to be generated; generating a second row sub-matrix corresponding to a second group of antennas respectively for the respective ranks based on an amount of the phase adjustment of the second group of antennas with respect to the first group of antennas; and generating a second codebook in accordance with the first row sub-matrix and the second row sub-matrix. As some embodiments of the method of the invention comprise the implementation of adjustment of the phase offset and the amplitude difference between the first and the second groups of antennas, the phase offset and the relative amplitude difference among the cross-polarized linear antennas array is guaranteed when the network device uses the downlink data generated therefore for transmission, such that the receiving quality of the transmitted data may be improved, and the system performance may be improved effectively.

10 Claims, 3 Drawing Sheets receiving the first codebook information from user equipment — S 11 determining the first codebook and the first codeword therein in accordance with the first codebook information — S 12 generating the first data in accordance with the first codeword — S 13

(51) Int. Cl.
*H04L 25/03* (2006.01)
*H04B 7/04* (2006.01)

(56) References Cited

U.S. PATENT DOCUMENTS

| | | | | |
|---|---|---|---|---|
| 2008/0192704 | A1* | 8/2008 | Kent et al. | 370/335 |
| 2008/0192852 | A1 | 8/2008 | Kent et al. | |
| 2011/0064156 | A1* | 3/2011 | Kim et al. | 375/267 |
| 2011/0096851 | A1* | 4/2011 | Clerckx et al. | 375/259 |
| 2011/0151918 | A1* | 6/2011 | Seo et al. | 455/522 |
| 2012/0087422 | A1 | 4/2012 | Zhou et al. | |
| 2012/0163496 | A1* | 6/2012 | Wang et al. | 375/295 |
| 2012/0170636 | A1* | 7/2012 | Wang et al. | 375/227 |

FOREIGN PATENT DOCUMENTS

| | | |
|---|---|---|
| TW | 200847670 | 12/2008 |
| TW | 201112664 | 4/2011 |
| WO | WO 2010/021471 A2 | 2/2010 |
| WO | WO 2010/024543 A2 | 4/2010 |

OTHER PUBLICATIONS

Samsung, “Precoding for 4-Tx Polarized Antennas,” R1-070945, 3GPP TSG RAN WG1 Meeting #48, St Louis, Missouri, USA, Feb. 12-16, 2007.*

Ericsson, “4 Tx Precoding Codebooks for Polarized Antenna Setup in LTE DL,” R1-073045, TSG-RAN WG1 #49bis, Orlando, USA, Jun. 25-29, 2007.*

Alcatel-Lucent, Alcatel-Lucent Shanghai Bell, AT&T, Intel, Orange, NEC, Philips, “On the importance of successive feedback refinement for cross-polarized antenna configurations,” R1-104195, 3GPP TSG RAN WG1 #61bis Meeting, Dresden, Germany, Jun. 28-Jul. 2, 2010.*

Alcatel-Lucent Shanghai Bell, Alcatel-Lucent, Proposal for 4-tx codebook enhancement for cross-polarized antennas, R1-114060, 3GPP TSG RAN WG1 Meeting #67, San Francisco, USA, Nov. 14-18, 2011.*

Lu Wu; Jinhui Chen; Hongwei Yang; Di Lu; “Codebook Design for Cross-Polarized Linear Antenna Array in LTE-A Downlink System,” 2011 IEEE Vehicular Technology Conference (VTC Fall), Page(s): 1-5.*

International Search Report for PCT/IB2012/000985 dated Sep. 13, 2012.

Catt, “Codebook Design for 8Tx DL MIMO”, R1-100022, 3GPP TSG RAN WG1 Meeting #59b, Valencia, Spain, Jan. 18-22, 2010.

Alcatel-Lucent Shanghai Bell, “Discussion of two-stage feedback proposals”, R1-104088, 3GPP TSG RAN WG1 Meeting #60bis, Dresden Germany, Jun. 28-Jul. 2, 2010.

Ericsson, “Further Refinements of Feedback Framework”, R1-101742, 3GPP TSG-RAN WG1 #60bis, Beijing, China, Apr. 12-16, 2010.

* cited by examiner

METHOD AND APPARATUS FOR GENERATING CODEBOOKS AND ASSOCIATED DATA IN A NETWORK DEVICE

FIELD OF THE INVENTION

The invention is related to wireless communication, particularly, to a method and apparatus for generating data in the network device.

BACKGROUND OF THE INVENTION

In practice, the cross-polarized linear array (CLA) is one kind of antenna configuration. The polarization of the antenna means the direction of intensity of the electrical field when the antenna is radiating. Such electrical wave is referred to as a vertical polarized wave when the direction of intensity of the electrical field is perpendicular to the ground; Such electrical wave is referred to as a horizontal polarized wave when the direction of intensity of the electrical field is parallel to the ground. The cross-polarized antenna is a bi-polarized antenna.

In frequency-division duplex (FDD) systems, the transmitter of a mobile network device obtains the channel information via quantization and limited feedback from each user. A codebook based on Channel Status Indicator (CSI) quantization is widely used in Long-term evolution(LTE) and Long-term evolution advanced (LTE-A) systems. In recent 3GPP RAN1 meetings, the cross-polarized linear array is determined to have the highest priority, and accordingly, the codebook of multiple antennas including the 4Tx codebook needs to be enhanced for performance improvement.

SUMMARY OF THE INVENTION

For a multiple-input multiple-output (MIMO) system with n (n is an even number) transmission antennas in a CLA configuration, the antennas may be divided into two sub-groups, i.e., two groups of different polarization antennas, where the first group of polarization antennas is on the same polarization direction, and the second group of polarization antennas is on the other polarization direction. For the first group of polarization antennas, the array response shows the form of a dicrete Fourier transform (DFT) vector. However, due to the existence of cross-polarization discrimination (XPD), the CLA channel does not appear a constant modulus property as a uniform linear array (ULA) channel. This means that there are amplitude and phase differences between the two antenna sub-groups.

Based on the research and analysis above, inventors of the invention realized that the polarization property of the cross-polarized linear antenna array is not considered thoroughly in existing methods of the codebook generation, that is, there is not only a relative phase offset, but also a relative amplitude difference between different polarization antennas, thus there may be a large error for the channel information feedback, which affects the system performance. For the cross-polarized linear antenna array, when the mobile equipment feeds back to the base station, the precoding matrix determined by the base station may reflect downlink channel information more accurately if the polarization property of the cross-polarized linear antenna array can be considered thoroughly in the transmitted codeword, thereby improving the system performance effectively.

Based on the concern above, in terms of the characteristic of CLA configuration, it is proposed a method for generating a codebook for the communication network in an embodiment of the invention, the communication network being configured with a cross-polarized linear antenna array, the cross-polarized linear antenna array comprising cross-polarized first and second groups of antennas, the method comprising the steps of: (a) generating a first row sub-matrix corresponding to the first group of antennas respectively for respective ranks; wherein the respective ranks corresponds to codebooks to be generated; (b) generating a second row sub-matrix corresponding to the second group of antennas respectively for the respective ranks based on an amount of the phase adjustment of the second group of antennas with respect to the first group of antennas; and (c) generating a second codebook in accordance with the first row sub-matrix and the second row sub-matrix.

By utilizing the codebook generated via the method above, it is proposed a method for using the codebook as described above to generate data in the network device in an embodiment of the invention, the network device comprising a cross-polarized linear antenna array, the cross-polarized linear antenna array comprising cross-polarized first and second groups of antennas, the method comprising the steps of: A. receiving first codebook information from a user equipment; B. determining a first codebook and a first codeword therein in accordance with the first codebook information; C. generating a first data in accordance with the first codeword, wherein the first codeword corresponds to a first matrix, and the first and second row sub-matrices of the first matrix correspond to the first group of antennas and the second group of antennas respectively; with respect to the first row sub-matrix, the second row sub-matrix reflects an amount of the phase adjustment of the second group of antennas with respect to the first group of antennas; and the respective column vectors of the first matrix are orthogonal.

It should be noted that the first group of antennas corresponds to the first polarization direction, and the second group of antennas corresponds to the second polarization direction, and the first polarization direction and the second polarization direction is in a cross configuration. The first row sub-matrix and the second row sub-matrix correspond to the first and the second groups of antennas respectively, the first row sub-matrix and the second row sub-matrix is respectively a row sub-matrix of the first matrix above, and "the first" and "the second" do not indicate the positions where they are located in the first matrix.

In addition, in accordance with an embodiment of the invention, it is also proposed an apparatus for generating data in the network device, the network device comprising a cross-polarized linear antenna array, the cross-polarized linear antenna array comprising cross-polarized first and second groups of antennas, the apparatus comprising: (a) a codebook information receiving unit for receiving first codebook information from a user equipment; (b) a codebook codeword determination unit for determining a first codebook and a first codeword therein in accordance with the first codebook information; (c) a data generation unit for generating a first data in accordance with the first codeword, wherein the first codeword corresponds to a first matrix, and the first and second row sub-matrices of the first matrix correspond to the first group of antennas and the second group of antennas respectively; with respect to the first row sub-matrix, the second row sub-matrix reflects an amount of the phase adjustment of the second group of antennas with respect to the first group of antennas; and the respective column vectors of the first matrix are orthogonal.

In accordance with an embodiment of the invention, it is also proposed an apparatus for generating a codebook for the communication network, the communication network being configured with a cross-polarized linear antenna array, the cross-polarized linear antenna array comprising cross-polarized first and second groups of antennas, the apparatus comprising: (A) a first row sub-matrix generation unit for generating a first row sub-matrix corresponding to the first group of antennas respectively for respective ranks; (B) a second row sub-matrix generation unit for generating a second row sub-matrix corresponding to the second group of antennas respectively for the respective ranks based on an amount of the phase adjustment of the second group of antennas with respect to the first group of antennas; and (C) a second codebook generation unit for generating a second codebook in accordance with the first row sub-matrix and the second row sub-matrix.

The method and apparatus of the embodiment of the invention reflect the polarization property of the cross-polarized linear antenna array thoroughly, the adjustments of the phase offset and the amplitude difference between different polarization antennas are included in the procedure in which the data to be transmitted is generated in some embodiments, so the feedback error of the channel information is reduced greatly, and the system performance is improved. The generation of the downlink-related data by the base station reflects the downlink channel information more accurately.

The aspects of the invention will be clearer through the specific embodiments hereinbelow.

BRIEF DESCRIPTION OF DRAWINGS

The above and other features of the invention will be more clear through reading the detailed description to the non-limiting embodiments in conjunction with the reference to the drawings.

In the drawings, like or similar reference numbers represent like or similar components.

DETAILED DESCRIPTION OF EMBODIMENTS

It is assumed that a network device in the communication network is configured with a cross-polarized linear antenna array. The cross-polarized linear antenna array comprises first and second groups of antennas, the first group of antennas corresponds to the first polarization direction, and the second group of antennas corresponds to the second polarization direction, and the first polarization direction and the second polarization direction are in cross configuration. The first group of antennas above comprises the antennas A1, A2, . . . , An; and the second group of antennas comprises the antennas B1, B2, . . . , Bn, wherein the antenna A1, A2, . . . , An are cross-polarized with the antennas B1, B2, . . . , Bn respectively.

Figure 2:
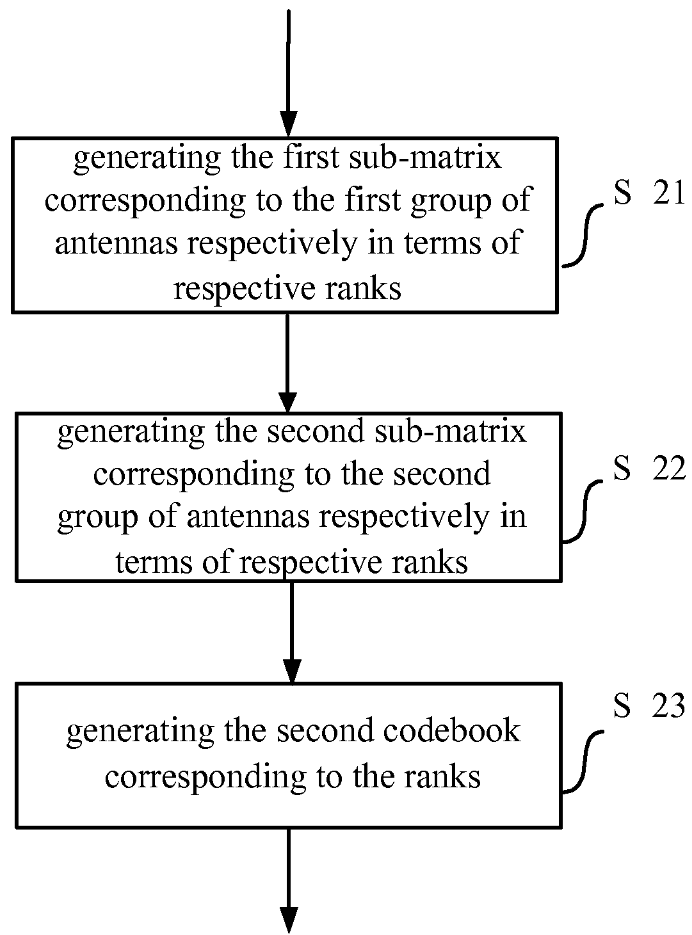
FIG. 2 is a flowchart of the method for generating a codebook for the communication network in accordance with an embodiment of the invention.

FIG. 2 is a flowchart of the method for generating a codebook for the communication network in accordance with an embodiment of the invention. By studying the characteristics of the cross-polarized antennas above and the signals of the channels corresponding thereto, in the embodiment above, a method of generation of the codebook proposed for the antenna configuration of the communication network above comprises a step of the generation of the first row sub-matrix S21, a step of the generation of the second row sub-matrix S22, and a step of the generation of the second codebook S23.

In the step S21, for the respective ranks corresponding to the respective codebooks to be generated, the first row sub-matrices corresponding to the first group of antennas are generated respectively. For example, the specific form of the first row sub-matrix may be the $1^{st}$ to $r^{th}$ columns of the matrix as shown in the equation below if the rank of the codebook to be generated is r:

$$\left[\alpha v_n \quad \sqrt{1-\alpha^2}\, v_n \quad \alpha v_{n+\frac{2N}{N_t}} \quad \sqrt{1-\alpha^2}\, v_{n+\frac{2N}{N_t}} \quad \cdots \quad \alpha v_{n+\frac{2N}{N_t}\left(\frac{N_t}{2}-1\right)} \quad \sqrt{1-\alpha^2}\, v_{n+\frac{2N}{N_t}\left(\frac{N_t}{2}-1\right)}\right]$$

In the step S22, for the respective ranks, the second row sub-matrices corresponding to the second group of antennas are generated respectively based on the amount of the phase adjustment of the second group of antennas with respect to the first group of antennas. For example, the second row sub-matrix may be generated to be the $1^{st}$ to $r^{th}$ columns of the matrix as shown in the equation below if the rank of the codebook to be generated is r:

$$\left[\sqrt{1-\alpha^2}\, e^{j\theta} v_n \quad -\alpha e^{j\theta} v_n \quad \sqrt{1-\alpha^2}\, e^{j\theta} v_{n+\frac{2N}{N_t}} \quad -\alpha e^{j\theta} v_{n+\frac{2N}{N_t}} \quad \cdots \quad \sqrt{1-\alpha^2}\, e^{j\theta} v_{n+\frac{2N}{N_t}\left(\frac{N_t}{2}-1\right)} \quad -\alpha e^{j\theta} v_{n+\frac{2N}{N_t}\left(\frac{N_t}{2}-1\right)}\right]$$

In the first row sub-matrix and the second row sub-matrix above, θ indicates the amount of the phase adjustment above; r indicates the rank of the codebook to be generated, r=1, 2, . . . , $N_t$; and $v_n$, for example, may be shown as the equation below:

$$v_n = \frac{1}{\sqrt{N_t/2}}\left[1 \quad e^{j\frac{2\pi n}{N}\cdot 1} \quad \cdots \quad e^{j\frac{2\pi n}{N}\cdot(N_t/2-1)}\right]^T, n = 0, 1, \ldots, N-1,$$

where N indicates the number of the DFT beams of the first group of antennas or the second group of antennas, and $N_t$ indicates the number of the antennas configured by the network device.

In the step S23, in accordance with the first row sub-matrix and the second row sub-matrix above, the second codebook is generated, for example, if the rank of the codebook to be generated is r, then by combining the first row sub-matrix and the second row sub-matrix above, the matrix corresponding to the codewords of the second codebook may be shown as the $1^{st}$ to $r^{th}$ columns of the equation below:

$$\begin{bmatrix} \alpha v_n & \sqrt{1-\alpha^2}\, v_n & \alpha v_{n+\frac{2N}{N_t}} & \sqrt{1-\alpha^2}\, v_{n+\frac{2N}{N_t}} & \cdots & \alpha v_{n+\frac{2N}{N_t}\left(\frac{N_t}{2}-1\right)} & \sqrt{1-\alpha^2}\, v_{n+\frac{2N}{N_t}\left(\frac{N_t}{2}-1\right)} \\ \sqrt{1-\alpha^2}\, e^{j\theta} v_n & -\alpha e^{j\theta} v_n & \sqrt{1-\alpha^2}\, e^{j\theta} v_{n+\frac{2N}{N_t}} & -\alpha e^{j\theta} v_{n+\frac{2N}{N_t}} & \cdots & \sqrt{1-\alpha^2}\, e^{j\theta} v_{n+\frac{2N}{N_t}\left(\frac{N_t}{2}-1\right)} & -\alpha e^{j\theta} v_{n+\frac{2N}{N_t}\left(\frac{N_t}{2}-1\right)} \end{bmatrix}$$

It should be noted that the number of the columns of the matrix is only illustrative, and the actual number of the columns of the matrix of the second codebook in the above equation is the same as that of the rank of the second codebook to be generated.

It is should also be noted that the amount of the amplitude adjustment of the first group of antennas with respect to the second group of antennas or the second group of antennas with respect to the first group of antennas is indicated by using $\alpha$ in a preferred manner in the embodiment herein, where $0<\alpha<1$. However, those skilled in the art should be appreciated that the second row sub-matrix corresponding to the second group of antennas may also be generated in terms of the respective ranks only based on the amount of the phase adjustment of the second group of antennas with respect to the first group of antennas or the amount of the phase adjustment of the first group of antennas with respect to the second group of antennas in the step S22 of some embodiments of the invention. For example, optionally, if $\alpha=1/\sqrt{2}$, then the codebook as described above is generated as a constant modulus matrix, wherein the amount of the amplitude adjustment of the first group of antennas with respect to the second group of antennas above is not reflected any more.

In addition, in the embodiment above, in accordance with the difference of application scenarios, in the procedure of the generation of the codebook, $\alpha$ and $\theta$ may be caused to have different value space, such that the generated codebooks have different volume. Generally, the preferred value may be a value greater than 2 or 4, for example, for a procedure of the generation of the codebook as described above, let $N=2^4$, $\alpha\in\{0.2, 0.6, 0.8, 0.9\}$, and $$\theta\in\left\{0,\ \frac{\pi}{2},\ \pi,\ -\frac{\pi}{2}\right\},$$

then the volume of the generated codebook is 8.

Meanwhile, as a preferred implementation, in the method of the embodiment above, for several second matrices corresponding to the codewords of the second codebook, the setting of $v_n$ therein causes the respective column vectors of the generated second matrix have the characteristics of orthogonality and nesting. Of course, the setting of $v_n$ is not limited to the form of the column vector above, and preferably, the matrix/vector form which makes the respective column vectors of the generated the second matrix orthogonal in the embodiment of the invention above may be used in the invention.

Moreover, in the method of the embodiment above, a step of the normalization of the matrix above may also be included. For example, the matrix corresponding to the second codebook is further divided by $\sqrt{r}$, in order to obtain the matrix form $U_n$ below, and the sub-matrix comprised of the $1^{st}$ to $r^{th}$ columns of the matrix $U_n$ below is to be the codeword of the second codebook, if the rank of the codebook to be generated is r:

$$U_n=\frac{1}{\sqrt{r}}\begin{bmatrix} \alpha v_n & \sqrt{1-\alpha^2}\, v_n & \alpha v_{n+\frac{2N}{N_t}} & \sqrt{1-\alpha^2}\, v_{n+\frac{2N}{N_t}} & \cdots & \alpha v_{n+\frac{2N}{N_t}\left(\frac{N_t}{2}-1\right)} & \sqrt{1-\alpha^2}\, v_{n+\frac{2N}{N_t}\left(\frac{N_t}{2}-1\right)} \\ \sqrt{1-\alpha^2}\, e^{j\theta} v_n & -\alpha e^{j\theta} v_n & \sqrt{1-\alpha^2}\, e^{j\theta} v_{n+\frac{2N}{N_t}} & -\alpha e^{j\theta} v_{n+\frac{2N}{N_t}} & \cdots & \sqrt{1-\alpha^2}\, e^{j\theta} v_{n+\frac{2N}{N_t}\left(\frac{N_t}{2}-1\right)} & -\alpha e^{j\theta} v_{n+\frac{2N}{N_t}\left(\frac{N_t}{2}-1\right)} \end{bmatrix}$$

In the $U_n$ in the equation above, in the case where the rank is 1, i.e., r=1 as above, the codeword thereof is readily to be understood. While in the method of the generation of the codebook, for the codeword in the case where there is a high rank (r>1), the codebook as described above is generated based on several beams which are orthogonal with each other by the method. Since $v_n$ therein has a DFT form, it is readily to derive that $v_{n_1}\perp v_{n_2}$ when $$n_1-n_2=\frac{2N}{N_t}K,$$

if the integer $K\neq 0$. Because $U_n$ has a characteristic of orthogonality and nesting, then the generated codebook also has the characteristic above.

Moreover, in the method of the embodiment above, preferably, the step S21 of the generation of the first row sub-matrix therein may further comprise a step of the generation of the first row sub-matrix corresponding to the first group of antennas by the DFT vector form in terms of the respective ranks. The step S22 of the generation of the second row sub-matrix may further comprise a step of the generation of the second row sub-matrix corresponding to the second group of antennas on the basis of the DFT vector form in terms of the respective rank respectively, based on the amount of the phase adjustment and the amount of the amplitude adjustment of the second group of antennas with respect to the first group of antennas as above. Next, in the step S23, a preferred second codebook is generated in accordance with the generated first and second row sub-matrices as above.

Using the method for generating the codebook for the communication network above, a series of codebooks may be obtained, and at least part of those codebooks have at least one characteristic as below due to the application of the method of the embodiment of the invention:

(1) In version 10, a plurality of cross-polarized antenna codebook has large volume;

(2) The first and second row sub-matrices in the codeword of the codebook above have the form of DFT vector respectively;

(3) There is certain amplitude adjustment and/or phase adjustment between the first and second row sub-matrices of each codeword of the codebook. Only certain phase adjustment is presented between the first and second row sub-matrices of each codeword of the generated codebook, if the codebook needs to maintain characteristics of constant modulus.

(4) The codebook has characteristics of orthogonality and nesting, which is an advantageous characteristic in the engineering application.

The codebook generated by the method above may be used to generate the associated data, such as a precoding matrix, etc., even further generate at least one data stream transmitted by a transmission antenna of the E-UTRAN Node B (eNB).

Figure 1:
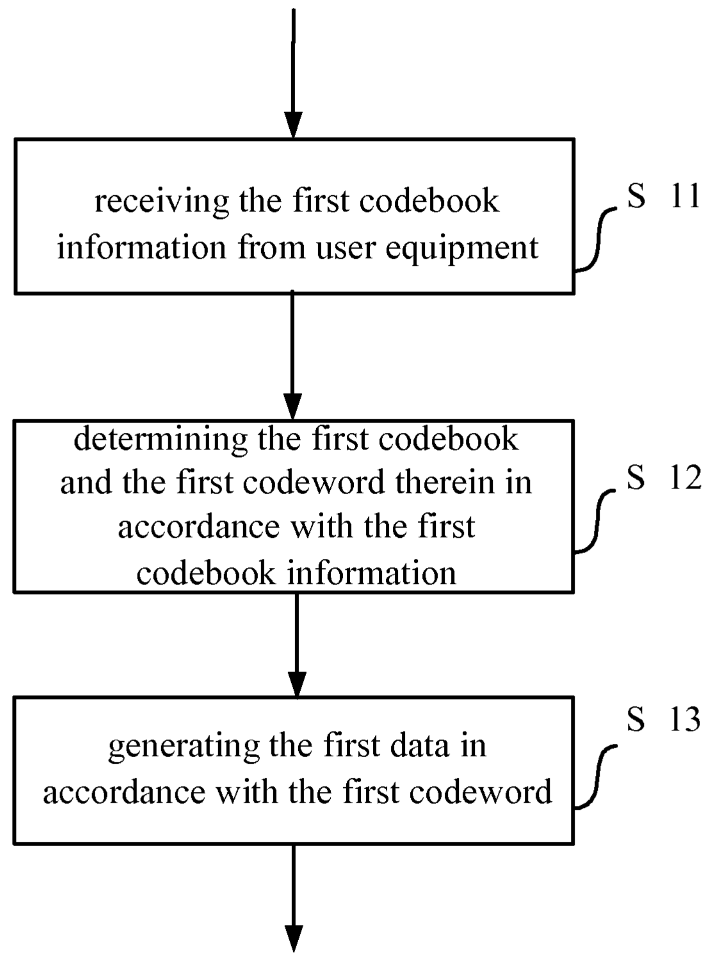
FIG. 1 is a flowchart of the method for generating data in a network device in accordance with an embodiment of the invention.

FIG. 1 is a flowchart of the method for generating data in a network device in accordance with an embodiment of the invention. The description of the application scenario of the generation of the associated data by using the codebook is made in some embodiments of the invention in conjunction with FIG. 1 hereinbelow. The method as shown in FIG. 1 comprises the step S11 of the receiving of the first codebook information, the step S12 of the determination of the first codebook and the codeword, and the step S13 of the generation of data.

In step S11, the eNB receives the first codebook information from the user equipment.

In step S12, the eNB determines the first codebook and the first codeword therein in accordance with the first codebook information.

In step S13, the first data is generated in accordance with the first codeword. The first data is, for example, a precoding matrix, which then may be used to combine with data to be transmitted so as to generate data streams that can be transmitted to a downlink channel through the antenna subsequently. The further usage of the first data is readily understood by those skilled in the art, and will be omitted herein.

Wherein the first codeword corresponds to the first matrix, the first and second row sub-matrices of the first matrix corresponds to the first and second groups of antennas respectively; With respect to the first row sub-matrix, the second row sub-matrix reflects the amount of the phase adjustment of the second group of antennas with respect to the first group of antennas; and the respective column vectors of the first matrix are orthogonal. For example, the first matrix above may be a sub-matrix comprised of the $1^{st}$ to $r^{th}$ columns of the matrix as shown in the equation below if the rank of the codebook to be generated is r:

$$\Big[\alpha v_n \quad \sqrt{1-\alpha^2}\, v_n \quad \alpha v_{n+\frac{2N}{N_t}} \quad \sqrt{1-\alpha^2}\, v_{n+\frac{2N}{N_t}} \quad \cdots$$

-continued $$\alpha v_{n+\frac{2N}{N_t}\left(\frac{N_t}{2}-1\right)} \quad \sqrt{1-\alpha^2}\, v_{n+\frac{2N}{N_t}\left(\frac{N_t}{2}-1\right)}\Big]$$

The second row sub-matrix may also be a sub-matrix comprised of the $1^{st}$ to $r^{th}$ columns of the matrix below:

$$\Big[\sqrt{1-\alpha^2}\, e^{j\theta} v_n \quad -\alpha e^{j\theta} v_n \quad \sqrt{1-\alpha^2}\, e^{j\theta} v_{n+\frac{2N}{N_t}} \quad -\alpha e^{j\theta} v_{n+\frac{2N}{N_t}} \quad \cdots$$
$$\sqrt{1-\alpha^2}\, e^{j\theta} v_{n+\frac{2N}{N_t}\left(\frac{N_t}{2}-1\right)} \quad -\alpha e^{j\theta} v_{n+\frac{2N}{N_t}\left(\frac{N_t}{2}-1\right)}\Big]$$

where in the first row sub-matrix and the second row sub-matrix above, θ indicates the amount of the phase adjustment above; r indicates the rank of the codebook to be generated, r=1, 2, . . . , $N_t$; and $v_n$, for example, may be shown as the equation below:

$$v_n = \frac{1}{\sqrt{N_t/2}}\left[1 \quad e^{j\frac{2\pi n}{N}\cdot 1} \quad \cdots \quad e^{j\frac{2\pi n}{N}\cdot(N_t/2-1)}\right]^T,\ n = 0, 1, \ldots, N-1,$$

where N indicates the number of the DFT beams of the first group of antennas or the second group of antennas, and $N_t$ indicates the number of the antennas configured by the network device.

Thereby, if the rank of the codebook to be generated is r, the sub-matrix of the $1^{st}$ to $r^{th}$ columns of the matrix below that is combined by the first and second row sub-matrices above may be taken as the first matrix corresponding to the first codeword, for the generation of the associated data by the eNB:

$$\begin{bmatrix} \alpha v_n & \sqrt{1-\alpha^2}\, v_n & \alpha v_{n+\frac{2N}{N_t}} & \sqrt{1-\alpha^2}\, v_{n+\frac{2N}{N_t}} & \cdots & \alpha v_{n+\frac{2N}{N_t}\left(\frac{N_t}{2}-1\right)} & \sqrt{1-\alpha^2}\, v_{n+\frac{2N}{N_t}\left(\frac{N_t}{2}-1\right)} \\ \sqrt{1-\alpha^2}\, e^{j\theta} v_n & -\alpha e^{j\theta} v_n & \sqrt{1-\alpha^2}\, e^{j\theta} v_{n+\frac{2N}{N_t}} & -\alpha e^{j\theta} v_{n+\frac{2N}{N_t}} & \cdots & \sqrt{1-\alpha^2}\, e^{j\theta} v_{n+\frac{2N}{N_t}\left(\frac{N_t}{2}-1\right)} & -\alpha e^{j\theta} v_{n+\frac{2N}{N_t}\left(\frac{N_t}{2}-1\right)} \end{bmatrix}$$

$$\begin{bmatrix} & & & \cdots \\ \alpha v_n & \sqrt{1-\alpha^2}\, v_n & \alpha v_{n+\frac{2N}{N_t}} & \sqrt{1-\alpha^2}\, v_{n+\frac{2N}{N_t}} \\ \alpha v_{n+\frac{2N}{N_t}\left(\frac{N_t}{2}-1\right)} & \sqrt{1-\alpha^2}\, v_{n+\frac{2N}{N_t}\left(\frac{N_t}{2}-1\right)} & & \end{bmatrix}$$

Optionally, the matrix above may be set to be nested for the advantage of the engineering application.

Again, as the first matrix corresponding to the first codeword, the number of the columns of the matrix above is equal to the rank indication from the user equipment.

In the embodiment above, the first codebook information may comprise a rank indication and a codeword indication. The first matrix may be a matrix normalized in accordance with the rank indication, for example, the first matrix may be a matrix that is generated by dividing the matrix as shown in the equation above by $\sqrt{r}$.

Take an example that the eNB is configured with 4 antennas, i.e., the first group of antennas comprises the antenna A1 and A2, and has the first polarization direction; while the second group of antennas comprises the antenna B1 and B2, and has the second polarization direction. Wherein the antenna A1 is cross-polarized with the antenna B1, and the antenna A1 is cross-polarized with the antenna B2, Let $v_n$ be a DFT vector with N points, which represents the phase relationship between the antenna elements on the same polarization direction $$v_n = \frac{1}{\sqrt{2}}\begin{bmatrix} 1 & e^{j\frac{2\pi n}{N}} \end{bmatrix}^T, n = 0, 1, \ldots, N-1$$

Corresponding to 4 cases where the rank r=1, 2, 3, 4, the first matrices corresponding to the respective codewords of the codebook above may be the sub-matrices comprised of the 1st column, the 1st to the 2nd columns, the 1st to the 3rd columns, and the 1st to the 4th columns of the matrix as shown in the equation below respectively:

$$U_n = \begin{bmatrix} \alpha v_n & \sqrt{1-\alpha^2}\, v_n & \alpha_{n+N/2} & \sqrt{1-\alpha^2}\, v_{n+N/2} \\ \sqrt{1-\alpha^2}\, e^{j\theta} v_n & -\alpha e^{j\theta} v_n & \sqrt{1-\alpha^2}\, e^{j\theta} v_{n+N/2} & -\alpha e^{j\theta} v_{n+N/2} \end{bmatrix}, \quad n = 0, 1, \ldots, N-1$$

Where α and θ indicate the adjustments of amplitude and phase between the two sub-groups. Since $U_n$ has the characteristics of orthogonality and nesting, then the codebook and the matrix thereof also have the characteristics of orthogonality and nesting, which is beneficial for the practice application.

It is set that $$\alpha = \frac{1}{\sqrt{2}},$$

if $U_n$ above has a constant modulus, such that the matrix of the codebook corresponding to rank 4 may be shown as the equation below:

$$U_n = \begin{bmatrix} v_n & v_n & v_{n+N/2} & v_{n+N/2} \\ e^{j\theta} v_n & -e^{j\theta} v_n & e^{j\theta} v_{n+N/2} & -e^{j\theta} v_{n+N/2} \end{bmatrix}, n = 0, 1, \ldots, N-1$$

For the matrices of the codebook corresponding to rank r=1, 2, 3, then the 1st, 2nd, and 3rd columns of $U_n$ in the equation above may be taken.

Although the description of some embodiments of the invention is made by the application scenario of the eNB configured with 4 transmission antennas in the communication network herein, those skilled in the art will be appreciated that the specific number of the antennas is not a limitation to the invention.

In another embodiment of the invention, the step S12 may further comprise steps of the determination of the first codebook in accordance with the rank indication, and the determination of the first codeword from the first codebook in accordance with the codeword indication.

Furthermore, optionally, the first and second row sub-matrices in the embodiment above may be in the DFT vector form, wherein with respect to the first row sub-matrix, the second row sub-matrix both reflects the amount of the amplitude adjustment of the second group of antennas with respect to the first group of antennas and the amount of the phase adjustment therebetween.

In the experiment conducted in accordance with the embodiment above, the system experiment is performed over a 19 site cells (57 pentagon sectors). The parameters and conditions of the experiment are shown in table 1.

TABLE 1 experiment parameters and premises

| Parameter | Value |
|---|---|
| Channel model | 3GPP scenario 1, high angle spread (15°) |
| Traffic model | Full buffer |
| Antenna configuration | 4-Tx eNB: CLA, +/−45°, 0.5 λ<br>2-Rx UE: CLA, +90/0°, 0.5 λ |
| Duplex method | FDD |
| Scheduler | Proportional fair, frequency selective scheduling, and greedy search |
| Link adaption | Not-ideal, 4 bits quantized, outer-loop control |
| Channel estimation | Not-ideal |
| Feedback impairments | CQI reporting period: 5 ms, 2 PRB<br>PMI reporting period: 5 ms, 2 PRB<br>Feedback delay: 6 ms |
| Downlink scheme | Single cell MU-MIMO: ZF method<br>CoMP scenario 2: MU-MIMO with 9 cluster coordination, ZF method |
| Number of co-scheduled UEs | MU-MIMO: maximum 4 UEs for 4 Txs, rank 1 per UE<br>CoMP (scenario 2): maximum 36 UEs for 9-cell clustering; rank 1 per UE |
| Rate Metric | Capacity based on constellations of QPSK, 16QAM, 64QAM |
| Downlink HARQ | Synchronous HARQ, maximum 4 transmissions |
| Control channel and reference signal overhead | Fixed 0.3063 (as agreed in ITU evaluation) |
| Test configuration | 300 frames |

The comparison of system performance between the proposed codebook in some embodiments of the invention and the Rel-10 codebook is shown in table 2.

TABLE 2 experiment result

| mode | Codebook type | average cell spectral efficiency (bits/s/Hz) | 5% cell edge user spectral efficiency(bits/s/Hz/user) |
|---|---|---|---|
| MU-MIMO | Rel-10 codebook | 2.31 | 0.079 |
| | Proposed codebook | 2.87 | 0.090 |
| | Gain of proposed over Rel-10 | 24.2% | 13.9% |
| CoMP | Rel-10 codebook | 2.44 | 0.093 |
| | Proposed codebook | 3.14 | 0.115 |
| | Gain of proposed over Rel-10 | 28.7% | 23.7% |

The result of the experiment illustrates that the proposed codebook in the embodiments of the invention exceeds the Rel-10 codebook in consideration of multi-user multiple-input multiple-output(MU-MIMO) and coordinated multi-point transmission/reception (CoMP) (scenario 2) modes, which improves the gains of average cell spectral efficiency and cell edge user spectral efficiency by 24%-29% and 14%-24% respectively.

Figure 3:
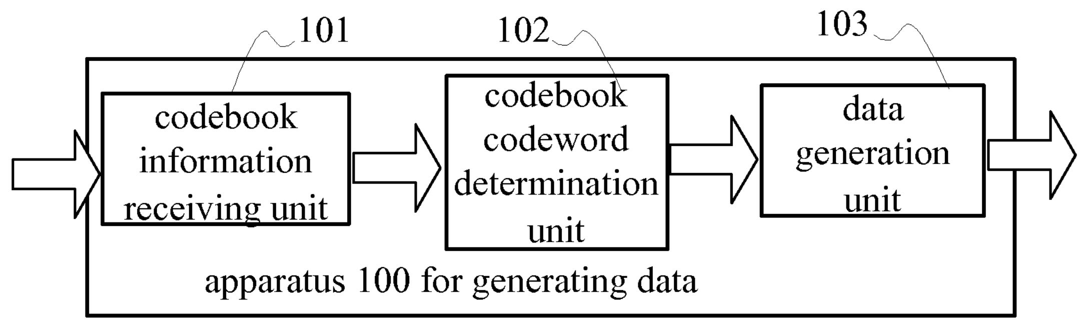
FIG. 3 is a functional block diagram of an apparatus for generating data in the network device in accordance with the embodiment of an aspect of the invention.

FIG. 3 is a functional block diagram of an apparatus 100 for generating data in the network device in accordance with the embodiment of an aspect of the invention. The apparatus 100 may be disposed in the eNB, and comprises a codebook information receiving unit 101, a codebook codeword determination unit 102, and a data generation unit 103.

The codebook information receiving unit 101 is for receiving first codebook information from a user equipment.

The codebook codeword determination unit 102 is for determining a first codebook and a first codeword therein in accordance with the first codebook information.

The data generation unit 103 is for generating a first data in accordance with the first codeword.

Wherein the first codeword corresponds to the first matrix, the first and second row sub-matrices of the first matrix corresponds to the first and second groups of antennas respectively; with respect to the first row sub-matrix, the second row sub-matrix reflects an amount of the phase adjustment of the second group of antennas with respect to the first group of antennas; and the respective column vectors of the first matrix are orthogonal.

Optionally, the first and second row sub-matrices above are in the DFT vector forms, and with respect to the first row sub-matrix, the second row sub-matrix expresses both the amount of the phase adjustment of the second group of antennas with respect to the first group of antennas, and the amount of the amplitude adjustment of the second group of antennas with respect to the first group of antennas, in order to be adaptive for different channel conditions.

Figure 4:
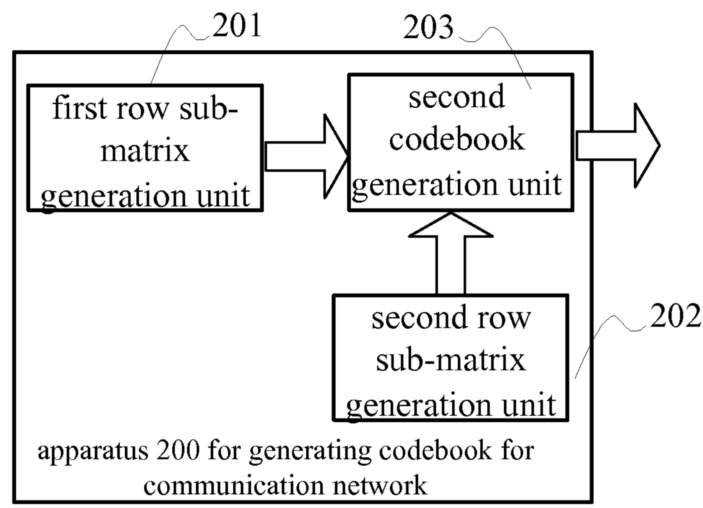
FIG. 4 is a functional block diagram of an apparatus for generating a codebook for the communication network in accordance with an embodiment of an aspect of the invention.

FIG. 4 is a functional block diagram of an apparatus 200 for generating the codebook for the communication network in accordance with an embodiment of an aspect of the invention. The apparatus 200 may be disposed in eNB, or disposed in other devices. After the codebook is generated, the codebook is delivered to the eNB or the user equipment that needs to use it. The apparatus 200 comprises a first row sub-matrix generation unit 201, a second codebook generation unit 202, and a second row sub-matrix generation unit 203.

The first row sub-matrix generation unit 201 is for generating a first row sub-matrix corresponding to the first group of antennas respectively for the respective ranks.

The second row sub-matrix generation unit 202 is for generating a second row sub-matrix corresponding to the second group of antennas respectively for the respective ranks based on an amount of the phase adjustment of the second group of antennas with respect to the first group of antennas.

The second codebook generation unit 203 is for generating a second codebook in accordance with the first row sub-matrix and the second row sub-matrix.

Optionally, the second codebook above is a matrix, and there is orthogonality between the respective column vectors in the matrix, and preferably, the second codebook may also be configured to be nested.

For the skilled in the art, it is apparent that the invention is not limited to the details of the above illustration embodiment, and the invention can be implemented by other specific implementations without departing from the spirit or elementary feature of the invention. Therefore, despite of any point, the embodiments should be construed to be illustrative, and not limitation, and any reference number in the claims should not be considered as the limitation to the claim involved. Moreover, obviously, the terms "comprise" and "comprising" are not exclusion of other elements or steps, and the terms "a", "an" and "the" are not exclusion of "plural" such elements. A plurality of elements recited in the products claims may also be implemented through software or hardware by an element. The terms "first" and "second" and so on are used to indicate the names, and not to indicate any certain order.

The invention claimed is:

1. A method for generating data in a network device, the network device comprising a cross-polarized linear antenna array, the cross-polarized linear antenna array comprising cross-polarized first and second groups of antennas, the method comprising:

receiving first codebook information from a user equipment;

determining a first codebook and a first codeword therein in accordance with the first codebook information; and generating a first data in accordance with the first codeword;

wherein the first codeword corresponds to a first matrix, and first and second row sub-matrices of the first matrix correspond to the cross-polarized first group of antennas and the cross-polarized second group of antennas respectively;

wherein with respect to the first row sub-matrix, the second row sub-matrix reflects an amount of phase adjustment of the cross-polarized second group of antennas with respect to the cross-polarized first group of antennas; and respective column vectors of the first matrix are orthogonal;

wherein the first codebook information comprises a rank indication and a codeword indication; the first matrix is a matrix normalized in accordance with the rank indication;

wherein determining further comprises:

determining the first codebook in accordance with the rank indication; and determining the first codeword from the first codebook in accordance with the codeword indication.

2. The method in accordance with claim 1, wherein the first codebook is set to be nested.

3. The method in accordance with claim 1, wherein the first and second row sub-matrices have DFT vector forms, and with respect to the first row sub-matrix, the second row sub-matrix reflects an amount of amplitude adjustment and the amount of the phase adjustment of the cross-polarized second group of antennas with respect to the cross-polarized first group of antennas.

4. The method in accordance with claim 3, wherein the first matrix is the 1~r columns of a matrix as shown in the equation below, $$U_n = \frac{1}{\sqrt{r}} \begin{bmatrix} \alpha v_n & \sqrt{1-\alpha^2}\, v_n & \alpha v_{n+\frac{2N}{N_t}} & \sqrt{1-\alpha^2}\, v_{n+\frac{2N}{N_t}} & \cdots & \alpha v_{n+\frac{2N}{N_t}\left(\frac{N_t}{2}-1\right)} & \sqrt{1-\alpha^2}\, v_{n+\frac{2N}{N_t}\left(\frac{N_t}{2}-1\right)} \\ \sqrt{1-\alpha^2}\, e^{j\theta} v_n & -\alpha e^{j\theta} v_n & \sqrt{1-\alpha^2}\, e^{j\theta} v_{n+\frac{2N}{N_t}} & -\alpha e^{j\theta} v_{n+\frac{2N}{N_t}} & \cdots & \sqrt{1-\alpha^2}\, e^{j\theta} v_{n+\frac{2N}{N_t}\left(\frac{N_t}{2}-1\right)} & -\alpha e^{j\theta} v_{n+\frac{2N}{N_t}\left(\frac{N_t}{2}-1\right)} \end{bmatrix}$$

where $\alpha$ indicates the amount of the amplitude adjustment, $0<\alpha<1$; $\theta$ indicates the amount of the phase adjustment; r indicates the rank indication, $r=1,2,\ldots,N_t$; and $v_n$ is as shown in the equation below, $$v_n = \frac{1}{\sqrt{N_t/2}}\left[1 \quad e^{j\frac{2\pi n}{N}\cdot 1} \quad \ldots \quad e^{j\frac{2\pi n}{N}\cdot(N_t/2-1)}\right]^T, n = 0, 1, \ldots, N-1,$$

where N indicates the number of DFT beams of the cross-polarized first group of antennas or the cross-polarized second group of antennas, and $N_t$ indicates the number of antennas configured by the network device.

5. The method in accordance with claim 4, wherein $\alpha=1/\sqrt{2}$, and size of the first codebook is greater than 2 bits.

6. A method for generating a codebook for a communication network, the communication network being configured with a cross-polarized linear antenna array, the cross-polarized linear antenna array comprising cross-polarized first and second groups of antennas, the method comprising:

generating a first row sub-matrix corresponding to the cross-polarized first group of antennas respectively for respective ranks; wherein the respective ranks corresponds to codebooks to be generated;

generating a second row sub-matrix corresponding to the cross-polarized second group of antennas respectively for the respective ranks based on an amount of phase adjustment of the cross-polarized second group of antennas with respect to the cross-polarized first group of antennas;

generating a second codebook in accordance with the first and second row sub-matrices;

wherein the second codebook is a matrix, the respective column vectors of the matrix are orthogonal, and the codebook is set to be nested; and normalizing the second matrix.

7. The method in accordance with claim 6, wherein the generation of the first row sub-matrix further comprises:

generating the first row sub-matrix corresponding to the cross-polarized first group of antennas with a DFT vector form for the respective ranks respectively;

wherein the generation of the second row sub-matrix further comprises:

generating the second row sub-matrix corresponding to the cross-polarized second group of antennas on the basis of the DFT vector form for the respective ranks respectively, based on the amount of the phase adjustment and an amount of amplitude adjustment of the cross-polarized second group of antennas with respect to the cross-polarized first group of antennas.

8. An apparatus for generating data in a network device, the network device comprising a cross-polarized linear antenna array, the cross-polarized linear antenna array comprising cross-polarized first and second groups of antennas, the apparatus comprising:

a codebook information receiver configured to receive first codebook information from a user equipment;

a codebook codeword calculator configured to calculate a first codebook and a first codeword therein in accordance with the first codebook information; and a data generator configured to generate a first data in accordance with the first codeword;

wherein the first codeword corresponds to a first matrix, and first and second row sub-matrices of the first matrix correspond to the cross-polarized first group of antennas and the cross-polarized second group of antennas respectively;

wherein with respect to the first row sub-matrix, the second row sub-matrix reflects an amount of phase adjustment of the cross-polarized second group of antennas with respect to the cross-polarized first group of antennas; and respective column vectors of the first matrix are orthogonal;

wherein the first codebook information comprises a rank indication and a codeword indication; the first matrix is a matrix normalized in accordance with the rank indication;

wherein the codebook codeword calculator further configured to:

calculate the first codebook in accordance with the rank indication; and calculate the first codeword from the first codebook in accordance with the codeword indication.

9. The apparatus in accordance with claim 8, wherein the first and second row sub-matrices have DFT vector forms, and with respect to the first row sub-matrix, the second row sub-matrix reflects an amount of amplitude adjustment and the amount of the phase adjustment of the cross-polarized second group of antennas with respect to the cross-polarized first group of antennas.

10. An apparatus for generating a codebook for a communication network, the communication network being configured with a cross-polarized linear antenna array, the cross-polarized linear antenna array comprising cross-polarized first and second groups of antennas, the apparatus comprising:

a first row sub-matrix generator configured to generate a first row sub-matrix corresponding to the cross-polarized first group of antennas respectively for respective ranks;

a second row sub-matrix generator configured to generate a second row sub-matrix corresponding to the cross-polarized second group of antennas respectively for the respective ranks based on an amount of phase adjustment of the cross-polarized second group of antennas with respect to the cross-polarized first group of antennas; and a second codebook generator configured to generate a second codebook in accordance with the first and second row sub-matrices;

wherein the codebook is a matrix, the respective column vectors of the second matrix are orthogonal, and the second codebook is set to be nested and the second matrix is set to be nested.

* * * * *